Aug. 22, 1967  H. EHRENS ET AL  3,336,937
LINE TAP VALVES

Filed July 15, 1964  2 Sheets-Sheet 1

INVENTORS
Henry Ehrens
Sidney Weiner
BY *J. L. Yules*
ATTORNEY

INVENTORS
Henry Ehrens
Sidney Weiner
BY
ATTORNEY

Patented Aug. 22, 1967

3,336,937
LINE TAP VALVES
Henry Ehrens, Riverdale, N.Y., and Sidney Weiner, Cresskill, N.J., assignors to Seal Unit Parts Co., Inc., Bronx, N.Y., a corporation of New York
Filed July 15, 1964, Ser. No. 382,764
8 Claims. (Cl. 137—318)

This invention relates to line tap valves, for use in tapping a pipeline, generally to remove the fluid contents of the line and the system to which it may be connected, or to inject a fluid into the line and its associated system.

One field of application of the invention is referred to herein, as for a household refrigerator, merely by way of example, for use with a small pipeline, in a first modification, and to illustrate the manner in which the invention may be employed.

For example, in a household refrigerator, in which the refrigerating apparatus is disposed in a chamber or cubicle in part of the box and the remainder of the box is available for the storage of food, the space made available for the refrigerating unit has been progressively diminished in successive designs, in order to make more space available for food storage, within the limited space left available in a kitchen for such a refrigerator box.

Consequently, when the refrigerating apparatus in such a box becomes faulty, and requires servicing, access to the refrigerator apparatus is difficult when the apparatus is not to be removed from the box and taken to a repair shop. When the repairs are to be performed at the location of the box, without removing the apparatus from its compartment, or at least not too far from the vicinity of the box, it is necessary to unload the compressor of the refrigerator unit, so that the various elements and components of the refrigerator apparatus may be readily moved, either to detect the location or nature of the fault, or to correct the fault itself.

In order to simplify the unloading of the compressor and the associated apparatus, the refrigerant is removed from the system. The removal of the refrigerant, and the subsequent recharging of the system with fresh refrigerant after the repairs have been made, require access to the pipeline system. A valve to permit such access is ordinarily not provided in the refrigeration apparatus in the factory installation, for various reasons. In order to make such repairs, it is therefore necessary for the repairman to provide a valve for the pipeline system that conducts the refrigerant, so the refrigerant may be removed from the system until the repairs are made, and so a fresh refrigerant can then be in injected into the system for proper operation of the refrigerator apparatus.

Considerable work has been done in the prior art to develop a valve that can be used to tap a pipeline, and, by specific application, to tap a refrigerator pipeline that carries the refrigeration fluid. Since the application of such a valve tap implies and requires the puncture of such a pipeline, as the easiest way of providing an orifice for removal of the refrigerant, and for subsequent reinjection of the refrigerant, a seal must be provided to cover the punctured hole thus made in the pipeline.

Conventional practice is such as to leave the valve elements on the pipeline and to rely upon those elements to serve as a seal for the opening formed in the pipeline to provide the tap.

One of the factors overlooked by many of the prior art devices, is the continued vibration of the pipelines of the refrigerator apparatus, due to the various unbalanced forces that are developed during operation of the motor-driven compressor.

In the prior art devices, the various constructions have been such that the elements of the valve, left as permanent seals on the pipeline, have not been symmetrical with respect to the pipeline axis and have therefore presented a center of mass, or center of gravity, radially displaced from the axis of the pipeline in the neighborhood of the tapped hole in the pipeline. Consequently, upon the vibration of the pipeline, with such eccentric mass attached thereto, the result has been to loosen those parts that were left and intended to be a permanent seal on the tapped pipeline. With such loosening, a leak developed that permitted loss of the refrigerant from the refrigerator apparatus with a consequent need for further service to repair the new damage caused by such valve.

Another difficulty caused by the vibration, naturally attending the operation of such a refrigerating apparatus, has been the tendency on the part of the repair valve parts to shift position on the pipe to which they were clamped. Excessive clamping pressure, in most cases, merely distorted the pipe section and destroyed the sealing effect of the valve elements on that pipe section. Another type of procedure in connection with such a line tap valve has employed parts to be clamped to the pipe and to support a needle to puncture the pipeline, with a master valve to be temporarily attached to such valve parts to operate the needle and puncture the pipeline and then drain the system of the refrigerant. After completion of the repairs required, a fresh charge of the refrigerant was injected into the refrigerating system through the master valve and the valve parts attached to the pipeline then suitably closed, so the master valve could then be removed from those valve parts that were to be left on the pipeline as a seal.

One modification of a valve embodying the invention is made for use with small tubing, not over a half-inch in diameter. Such sizes may range, for example, from an outside diameter of $3/16$ inch to an outside diameter of about $3/8$ inch. For the economy in manufacture, one size valve should be able to accommodate several such small sizes.

A primary object of this invention is to provide a valve of one size with suitable adapter and design construction to enable such valve to receive and accommodate any selected size of pipeline tubing from a range of closely related dimensions.

Another object of the invention is to provide a line tap valve designed to accommodate the largest size tubing of a series of dimensions, with means for compressing a tubing of smaller diameter to a contour arc corresponding to the designed surface contour, in order thereby to establish a complete and permanent seal.

In such modification a top block and a bottom block, each with a semi-circular groove, are formed to engage the tubing snugly, and are arranged to be secured tightly in such snugly-fitting position, with a single needle screw supported on the top block to be movable on an axis transverse to the axis of the tubing, to be able to penetrate the tubing and then to be retractable from penetrating position to permit access to the tubing, for a fluid to flow through a passageway in the upper block leading to an outer port. The needle screw serves also as a valve element subsequently to seal off such passageway, with a sealing ring positioned around a body shank of the needle screw and arranged to be compressed against such shank and between the top block and a supporting element for the needle screw to assure a positive seal, at all times, at the surface of said body shank and between the two engaged surfaces of the top block and the supporting element for the needle screw. This is a most important feature of the invention, whereby the sealing ring provides a complete and positive seal, in all positions of the needle screw of the valve, when the valve is operatively assembled on a tubing with which the valve is to be utilized.

This modification represents a relatively miniaturized structure arranged to permit the valve needle to be of minimum length, and thereby to permit the associated structure to be of minimum size and mass.

The construction in this modification, whereby the length of the needle screw is reduced to a minimum, is an important feature that leads to a structure of minimum mass, particularly important in the application and use described herein.

Another object of the invention is to provide a line tap valve that shall be complete in itself and not require the use of any auxiliary equipment such as master valves.

Another object of the invention is to provide a line tap valve structure whose mass center will be relatively close to the axis of the pipeline to which the valve is attached, so that any vibration resulting from the operation of any equipment or apparatus attached to the pipeline will have a minimum effect, in any tendency to disturb the mechanically clamped relationship between the valve parts and the pipeline to which they are attached.

Another object of the invention is to provide a line tap valve, for connection to a pipeline section, with registering grooves in two clamp parts to be assembled from opposite sides of the pipeline, with a combination frictional and sealing medium between the pipe and at least one of the clamping parts of the valve, the characteristics of the material being such that the material will be conformed to the exposed surface of the pipeline to such an extent that the gripping friction of the sealing medium on the pipeline will be sufficient to withstand any torsional forces that will be developed in the valve by the resultant vibration of the pipeline due to its connection to the vibrating refrigeration apparatus.

Another object of the invention is to provide a line tap valve in which the frictional sealing medium is relatively hard and stable against change of its hardness and sealing characteristics under normal operating conditions of temperature, pressure and vibration, and therefore capable of maintaining an imposed pressure and sealing condition against a section of pipeline permanently under such normal operating conditions.

Another object of the invention is to provide a line tap valve in which an adapter element is employed for each pipeline size smaller than the diameter of the bore defined by the two registering grooves in the two blocks to be clamped around the pipeline.

Another object of the invention is to provide a line tap valve having two clamping blocks with registering grooves to define a bore to receive a section of pipe line of smaller outside diameter than the diameter of the bore, with a suitable arcuate adapter seated in one groove to support the section of pipeline and with the other groove lined with a hard frictional sealing gasket material, so the section of supported and clamped pipeline will be compressed and slightly distorted and changed in curvature to conform tightly to said frictional material to withstand vibrational effects from external forces and remain unmoved, and to maintain an effective seal on and around a punctured area of such clamped section of pipeline.

Another object of the invention is to provide a conduit passage, in one of the valve blocks, to terminate at an inner port that can be closed at a passage disposed within a controlled valve seat and leading to a punctured hole in the pipeline, thereby eliminating the need for an external detachable master valve, and, further, thereby utilizing the already available valve seat to serve as a permanent seal when the valve seat is closed, following the completion of the repair work on the associated equipment.

Another, and particularly important, object of the invention, is to provide a valve construction, in which a single needle screw element serves to puncture the pipeline section at the point desired, to permit the refrigerant to empty out from the pipeline and its related system into the nearby conduit passage, to be collected externally in any suitable container, with the stem simultaneously serving as part of a sealing arrangement to prevent flow of the refrigerant in any other direction through the valve parts, so that all of the refrigerant may be collected in passage through and from the predetermined conduit passageway, whereupon, after completion of the repair operation, the needle valve may be moved to its full seating position at which it will effectively seal off any passage between the valve parts and the hole formed by the puncture in the pipeline.

A further object of the invention is to provide a line tap valve, of the type described, which shall have a minimum number of parts that are both economical to manufacture and relatively easy to assemble or disassemble with the need of only a simple Allen wrench to fit the needle valve itself and the clamping screws for the unit in its assembly upon the pipeline to be tapped.

The various objects as here set out, and other advantages of the valve disclosed herein, will be made apparent and pointed out in the following description, taken together with the accompanying drawings, in which.

Figure 1:
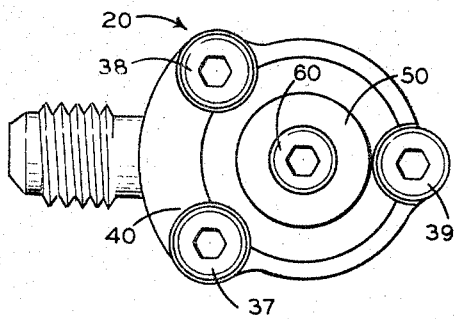
FIGURE 1 is a plan view of the valve assembly of one modification embodying this invention for use on small tubing.

As shown in the drawings, a line tap valve 20 which is to be fitted to a pipeline 25 to puncture a hole in that pipeline, comprises a base or bottom block 30, a top or head block 40, a cap ring 50 and a needle screw 60. As shown in FIGURE 5, the base block 30 is provided with a transverse groove 32 that is semi-cylindrical in form to accommodate and fit snugly around the bottom of a pipe of corresponding radius, to which the valve is to be applied. A small circular cavity 32A is provided for anchoring an adapter, as will be explained below. The top surface 33 of the base block 30 is planar and relatively as smooth as possible. Similarly, the groove 32 should have a relatively smooth surface throughout its contour. Three threaded bolt holes 34, 35 and 36 are provided to receive the ends of three clamping bolts 37, 38 and 39, shown in FIGURE 1 and otherwise indicated in FIGURES 3 and 4.

Figure 3:
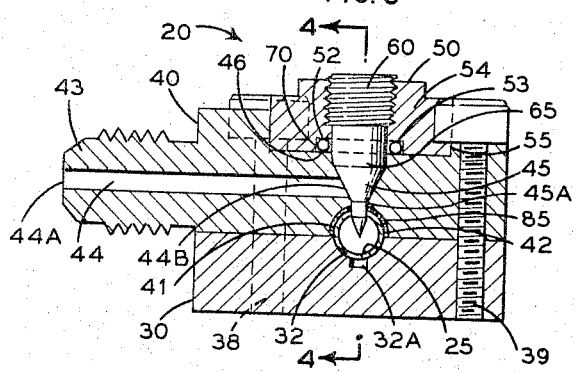
FIGURE 3 is a vertical section of the assembly as shown in FIGURE 2, with the valve stem shown in elevation for clearness.
Figure 4:
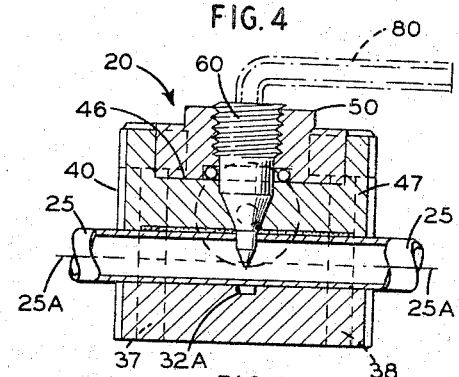
FIGURE 4 is a vertical transverse section of the structure shown in FIGURE 2, taken along the lines 4—4 and in the direction indicated by those lines in FIGURE 3.
Figure 5:
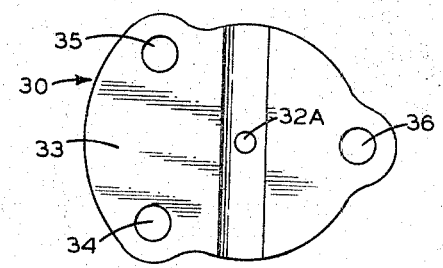
FIGURE 5 is a plan view of the base block to fit along the bottom of a pipe section to be tapped.

As shown in FIGURES 3 and 4, the base block 30 and the top block 40 are fitted together to encircle the pipeline 25 which is to be punctured.

The top block 40 is provided with a transverse groove 41 to register with the groove 32 in the lower or base block 30. The upper groove 41 is shaped around the same center axis as the lower groove 32, but the radius of the upper groove 41 is slightly larger than that of the lower groove 32, in order to accommodate a thin shaped layer 42 of sealing material, as a gasket, having an inner contour surface of a radius corresponding to that of the lower groove 32.

When the bottom block 30 and the top block 40 are pressed together to encircle the pipe 25, the pipe will seat snugly in the groove 32 and in the corresponding groove in the sealing material gasket 42 with a slight spacing left between the bottom surface of the top block 40 and the top surface of the bottom block 30 to permit the tightening of the clamping bolts 37, 38 and 39 to put the sealing material gasket 42 in sufficient compression, together with the pipe 25, to assure a tight, frictional bond between the sealing material gasket 42 and the pipe 25 to assure that the fixed relationship between the valve unit and the pipe section 25 will not be loosened or affected by the vibration experienced by the pipe during subsequent operation of the refrigerating equipment.

The use of this sealing material gasket 42 with a characteristic large coefficient of friction, and shaped generally to conform to the contour of the pipe of largest diameter in the series to be accommodated, is one of the important features of this invention. It serves as a permanent seal around the orifice or hole that is punctured or pierced into the pipe, and is effective both during and after the draining and refilling operation and the resealing of the valve unit. It also serves a further purpose of shaping the pipe section of smaller contours, as will be explained in more detail below.

Another feature of the invention is the provision of a spout 43 on the top block 40, provided with a central bore 44 to serve as a transfer passageway for fluid from the pipe 25 to an external connection, that may be made to the spout 43 to receive and conserve the refrigerator fluid from the pipe 25. Subsequently, after repairs, the passage 44 serves to deliver a quantity of the fluid to recharge the system.

For convenience of reference, the transfer passage 44 has an outer port 44A and an inner port 44B.

Figure 6:
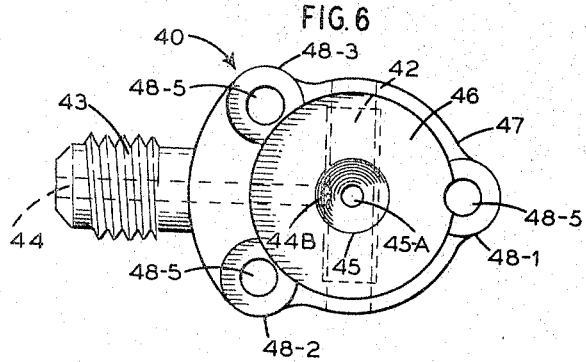
FIGURE 6 is a plan view of the top or head block that seats on the top of the pipe section to be tapped.

A further feature of the invention is the location as well as the provision of the inner port 44B of the transfer passage 44. As shown in FIGURES 3, 4 and 6, the inner port 44B is located intermediate the top and bottom planes or edges of a conical valve seat or surface 45. The axis of that conical valve seat 45 is preferably in a plane containing the axis of the pipe 25 and is located preferably perpendicular to the axis of the pipe 25. The conical valve seat recess 45 communicates with the groove 41 at the bottom of block 40.

The conical seat 45 serves to receive a correspondingly shaped tapered surface on the lower part of the shank of the threaded needle 60, presently to be described.

Figure 7:
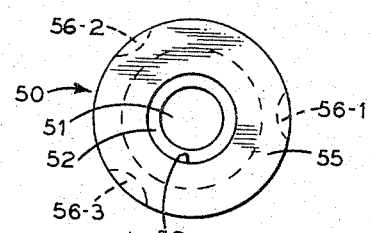
FIGURE 7 is a plan view of a cap which serves as the support for the needle valve.

As shown in FIGURES 3, 4 and 6, the upper block 40 is provided with a circular recess or seating cavity 46, concentric with the axis of the conical surface 45, to accommodate and to permit the nesting of the needle-supporting cap ring 50 of FIGURES 3 and 7. The circular recess 46 is encircled by the border rim 47, which is equivalent to a substantially circular boss encircling the seating cavity 46. The border 47 embodies the three enlarged bosses 48–1, 48–2 and 48–3 with axial bolt holes 48–5 for accommodating the respective bolts 37, 38 and 39, identified in FIGURE 1. As may be seen in FIGURE 3, the top surface of each of the three bosses 48–1, 48–2 and 48–3, is disposed slightly above the surface of the circular seating area 46, for the cap 50, so the bolt heads that engage the top surfaces of the bosses 48–1, 48–2 and 48–3 will also serve to clamp adjacent toe pieces on the cap ring 50, which will now be described in connection with FIGURE 7.

As shown in FIGURE 3, in section, and in FIGURE 7, in bottom plan, the cap ring 50 is substantially symmetrical about a central axis, and is provided with a central bore 51, with a bottom annular seat 52 formed as a shoulder between the bore 51 and a circular rim wall 53 which will serve as a confining wall for the outer or peripheral rim of an O-ring that will function with the threaded needle 60 to establish a positive seal between the bore 51 of the ring 50 and the pipeline 25 to which the valve is to be attached. This will be further explained in connection with the description of the threaded needle 60.

The cap ring 50 further embodies an annular body section 54 and a bottom annular flange seating portion 55 (FIGURES 3 and 7) whose diameter is such as to permit the cap ring 50 to slip fit into the circular cavity 46 in the top block 40. The seating flange 55, of cap ring 50, is provided with three surface recesses 56–1, 56–2 and 56–3, formed in the top surface of the annular seating flange 55, as arcuate segments to accommodate the head of the associated bolts 37, 38 or 39 as the bolt is moved to clamping position to clamp the elements of the valve together.

The function of the cap ring 50 is to support the threaded needle 60, and to cooperate with the threaded needle and the top surface of the upper block 40 to provide a temporary seal during the unloading of the pipeline in removing the refrigerant therefrom, and, subsequently, to provide a permanent back-up seal in addition to the valve seat seal, when the threaded needle is moved back down to the sealing position after the repairs and the refilling operation into the pipe line 25 have been completed.

Figure 8:
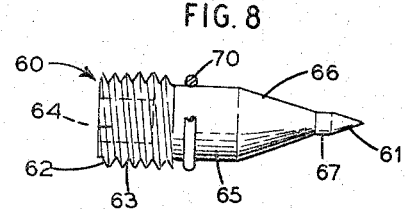
FIGURE 8 is a side elevational view of the needle valve.

The detailed construction of the threaded needle 60 may now be considered, as shown in FIGURE 8, particularly in connection with its manner of functioning, as may be seen upon reference to FIGURES 3 and 4.

As shown in FIGURE 8, the threaded needle 60 embodies a needle or point 61, and a head 62 having a threaded portion 63 with an hexagonal recess 64 to accommodate an Allen wrench for rotating the threaded needle. Any other form of recess and suitable actuator may be employed. The threaded needle 60 further embodies a cylindrical shank 65 co-axial with the head 62, and a truncated conical seating section 66, with a short narrow shank extension 67 from the small end of the truncated conical section 66 to the back of the needle or point 61.

On O-ring 70 is shown associated with the threaded needle 60, and is of appropriate dimension to have an internal diameter slightly less than the diameter of the shank portion 65 so that the O-ring will fit snugly on that shank portion 65 when pressed thereon. At the same time the outer dimension of the O-ring 70, as may be seen more clearly upon reference to FIGURE 3, should be such as to be compressed tightly between the shoulder 52 and the top surface 46 of the block 40 while at the same time being tightly confined between the surface of the shank 65, of the threaded needle 60, and the confining rim or wall surface 53. The function of the valve and the various parts thereof may now be reviewed.

The three block elements including the base block 30, the upper or top block 40 and the cap ring 50 are all made of relatively soft metal such as copper, white metal or aluminum, preferably, in order to keep the mass of the unit to a minimum. The threaded needle 60 is preferably of a hard metal, such as one of the steel elements or alloys that will particularly withstand any chemical effects of the refrigerant that will be used in the system.

Figure 2:
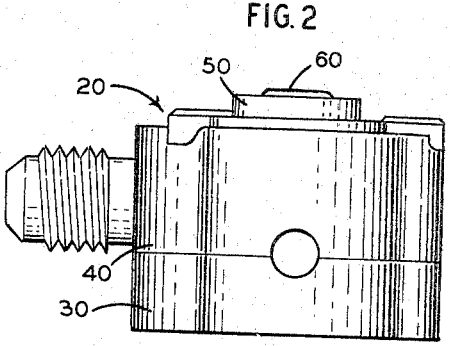
FIGURE 2 is a side elevational view of the assembly shown in FIGURE 1.

When the location of the point is determined at which the pipeline 25 is to be tapped, the two blocks 30 and 40 are positioned to encircle the pipeline 25 at that region, and the cap ring 50 is also in position in the top block 40, preferably with the threaded needle 60 and its related sealing O-ring 70 in place. The threaded needle 60 may be relatively in its elevated terminal position, since the O-ring 70 will be safety held against casual displacement. The two blocks 30, 40 and the ring 50 are now suitably bolted together by the cap bolts 37, 38 and 39, so the complete valve unit, as assembled on the pipe in accordance with FIGURE 3 and FIGURE 4, will constitute a compactly assembled mass on the pipeline having an external contour substantially as shown in FIGURE 2 and indicated in FIGURES 3 and 4.

By means of an Allen wrench 80 as shown in FIGURE 4, the threaded needle 60 may be rotated to advance its needle point 61 sufficiently to penetrate the wall and puncture the wall of the pipe 25 to provide the desired opening in that pipe through which the fluid in the pipe may be removed, and subsequently either the same or an alternate fluid recharged back into the pipe.

After the pipe 25 is punctured, the threaded needle 61 is retracted to permit the fluid from pipe 25 to pass through the punctured opening 85 in the pipe 25 and thence through the bottom bore 45A into the conical chamber outlined by the conical valve seat 45, and from thence into the transfer passage 44 out to the port 44A in the threaded spout 43.

Any repair work that is to be done to the refrigerating apparatus may now be safely performed, since the equipment is now unloaded by the removal of the refrigerant.

It will be observed, upon reference to FIGURE 3, that during the passage of the refrigerant from the pipe 25 into the transfer passage 44 and out through the port 44A, the refrigerant fluid, either as a liquid or as a gas, could not move upward past the threaded needle shank 65 or even upward and out through the space between the floor surface 45 of the central circular cavity 46 in the upper block and the bottom surface of the cap ring 50, since in both cases the sealing O-ring 70 serves to seal both the path along the surface of the shank 65 and also the horizontal path between the two surfaces represented by the circular pocket 46 and the cap ring 50.

After the repair work to the apparatus has been completed, the new charge of refrigerant may then be inserted through the outer port 44A of the transfer passage 44, and such newly injected refrigerant or other fluid, depending upon the nature of the system, will move inward through the transfer passage and the inlet port 44B through the bore opening 45A and into the pipe 25. After the desired volume of such recharge fluid is injected into the pipe 25 the threaded needle is then threaded downwardly against the tapered surface 45, which now acts as a valve seat with the truncated conical section 66 of the threaded needle 60 serving as a valve closure.

The location of the inner port 44B in the side wall of the valve seat 45, intermediate the top and bottom planes of that tapered valve seat 45, becomes now apparent.

This location of that inner port 45B of the transfer passage 44 within the surface area controlled by the valve seat, is an important feature of the present invention.

When the threaded needle 60 is now moved home to its valve seating position, the truncated conical shank section 66 presses downward against the conical seating surface 45 and completely closes off the inner port 44B, thus providing a complete positive mechanical seal between the passage 44 and the hole 85 punctured into the side wall of the pipe 25.

At the same time the O-ring seal 70 continues to serve as a second seal against fluid movement past any part of the flange portion 65, to an outer region.

As an additional feature in providing a positive mechanical seal at the inner port 44B, the taper of the valve seat 45 may be made one or two degrees off from the taper of the conical valve shank section 66, so the pressure imparted to the hard threaded needle body will reform the angular surface disposition of the valve seat 45 to fit exactly the taper of the hardened shank 66.

An important feature of the invention is the formation of the top block and cap ring as two pieces, to enable the O-ring seal to be placed close to the hole in the pipe, and also between that hole in the pipe and the threaded head of the screw needle. As a result, the screw needle, of relatively miniature size, accomplishes (1) piercing, (2) seating, (3) shaft sealing, in conjunction with the O-ring, and (4) threading to operate the needle, all within a dimension of ⅝ inch, which is not achievable by anything in the prior art.

As indicated above, an important object of this invention is the provision of a sealing medium between the valve and the pipe that will withstand external forces, and thereby serve as a permanent, non-deteriorating seal.

In the prior art devices, soft rubber gaskets have been empoyled to seal the puncture in the tube, since soft rubber would deform readily and conform to any uneven surface surrounding the puncture, thereby permitting greater tolerances in the valves, so they did not have to be critical or well engineered.

Rubber has disadvantages, however, because it is not permanent. The resiliency characteristic which favors its use in the first place, changes with time and because of contact with chemicals, namely, the refrigerant and oil. Consequently, its resistance to pressure changes.

In the refrigeration industry, for example, it is known that a line tap that has a rubber seal must not be installed on the discharge tube of a refrigerating unit because the heat of compression destroys the rubber, and the refrigerant leaks out through the destroyed rubber seal.

In the present valve, the gasket 42 is made to serve permanently in its environment, under all conditions. The gasket is made of compressed asbestos with a neoprene binder. Since such gasket is not pliable, like rubber, to adapt to any irregularities of the pipe, near the puncture, and is only slightly compressible, the valve design is made such as to provide adequate pressure to assure that the tube with its irregularities will be caused to conform to the preformed contour of the gasket.

Such pressure is achieved by the three cap screws 37, 38 and 39. With these cap screws, upward of sixty inch pounds of torque can be achieved, as by a small Allen wrench 80, shown in FIG. 4.

As a further feature to achieve the pressure desired, the inner contour surface of the sealing gasket 42, and the radius of the groove 32 in the bottom block 30, are about twenty thousandths (0.020) of an inch undersized, so that when the two blocks approach, under tension of the cap screws, the tubing between the two blocks is forced to conform to the surface contour of the gasket 42.

The properties of the compressed asbestos gasket are such that the effective sealing pressure limits improve with time and heat, and an action similar to vulcanizing takes place under the exerted pressure force, plus time and heat on the gasket. Deterioration in use does not occur in the gasket, which is essentially indestructible in that application, and lasts indefinitely.

Those properties of the gasket make the gasket an excellent element for use in a combination valve, as herein disclosed, for use with tubing in a range of sizes, as previously mentioned, including for example, tubing with external diameters from 3/16 inch to ⅜ inch. This feature may now be considered in connection with FIGURES 9 to 13.

Figure 9:
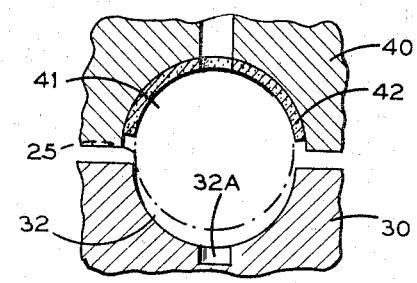
FIGURE 9 is a transverse vertical sectional view, representing an enlarged view of the bore between the two blocks, and showing particularly the hard frictional sealing material.

As shown in FIGURE 9, the base block 30 and the top block 40 are indicated in slightly spaced relation before being tightly coupled to press the gasket 42 against the tubing 25, here shown as of the maximum diameter to be accommodated by the valve.

Figure 10:
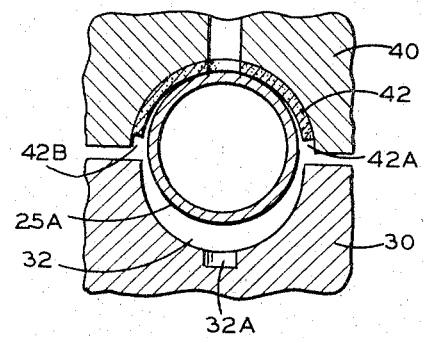
FIGURE 10 is a view of the elements of FIGURE 9, with a section of tubing in place having an outside diameter less than the diameter of the bore.

In FIGURE 10, the two blocks 30 and 40 are shown in similar position as in FIGURE 9, with a tubing 25A of smaller than maximum diameter shown positioned against the gasket 42 to indicate how the smaller tubing 25A would normally be spaced from the gasket 42 at the side edges of the gasket and would define two arcuate wedge-shaped air spaces 42A and 42B. FIGURE 10 also indicates how the tubing 25A would be spaced from the surface of groove 32 in lower block 30, before tightening of blocks 30 and 40.

Figure 11:
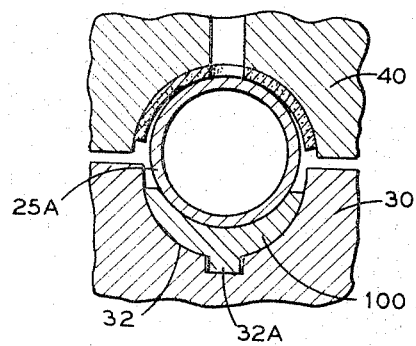
FIGURE 11 is a view of the elements of FIGURE 10, with an adapter in place between the pipeline tubing and the lower block, before the two blocks are tightened to predetermined closure position.
Figure 13:
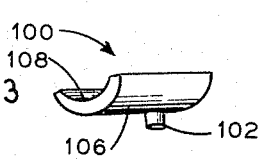
FIGURE 13 is a perspective view of the arcuate-shaped adapter for supporting the tubing in the bottom block, with a positioning and holding lug or boss on the adapter to fit into and be held by the bottom block.

In FIGURE 11, tubing 25A is shown in the same position as in FIGURE 10, but with a seating adapter 100 shown in FIGURE 13, positioned to rest in the groove 32 in lower block 30 to take up the space left by the smaller tubing 25A. To hold the adapter 100 in proper position against any displacing force, the adapter 100, shown in FIGURE 13, is provided with an integral holding lug or boss 102 that fits into the recess 32A formed in the lower block 30 just below the surface contour of the lower groove 32 as shown in FIGURE 5.

Figure 12:
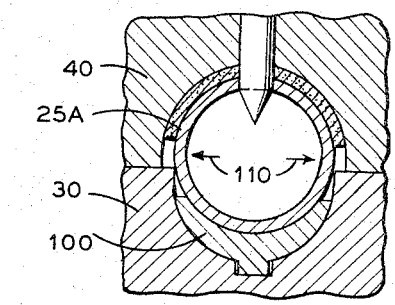
FIGURE 12 is a view of the elements of FIGURE 11 compressed for tight holding and sealing at closure position, with the puncturing needle shown in closing position in the tubing.

In FIGURE 12, the top block 40 and the bottom block 30 are shown pressed to closing position on the tubing 25A, as a result of the tightening of the three cap screws 37, 38 and 39, shown in detail in FIGURES 1 and 3. In such tightening operation of the two blocks 30 and 40, the tubing 25A will be slightly compressed and flattened, so the upper half-section of the tubing will be pressed to fully engage the entire internal, concave surface area of the gasket 42, by slight radially outward movement of the tubing side walls, as indicated by the two arrows 110.

The thickness of the gasket 42 has been exaggerated for the sake of clarity of illustration. In actual construction, the gasket may be relatively thin, and the curvature of the lower groove 32 on a larger diameter, which will permit the adapter side edges to reach up higher and closer to the lower side edges of the gasket, to provide fuller side support for the tubing opposite the two arrows 110 of FIGURE 12.

The construction of the adapter 100 is generally indicated in FIGURE 13, as a concave element having an outer arcuate surface 106 with a curvature corresponding to that of the groove 32, in the bottom block 30, and having an inner arcuate surface 108 with a curvature corresponding generally to that of the tubing 25A.

The valve may be modified in shape and form without departing from the spirit and scope of the invention, as described, and as set forth in the claims.

What is claimed is:

1. A line tap valve for use with any one of a consecutive series of stepwise increased diameter size pipelines, such valve comprising
    a metallic base block having a base planar surface and a top surface generally planar with a transverse fluted region in said top surface;
    a metallic top block to mate with said bottom block and having a generally planar bottom surface with a transverse fluted region with an arcuate cross-section portion in said bottom surface to mate with said transverse fluted region in said top surface, the two fluted regions mating to define a bore between the two blocks to accommodate a length of tubing of a pipeline;
    a needle supported in the top block transverse to said bore and movable axially to engage and to puncture a pipeline disposed in said bore;
    means for tightly coupling the top and the bottom blocks to a fixed position of engagement;
    and frictional holding means disposed to encircle said needle and to engage said pipeline for frictionally holding the pipeline against sliding displacement relative to said two blocks when said blocks are in tightly coupled relation, said friction holding means being an arcuate layer of material lining and conforming to said fluted region of said bottom surface of said top block, said material being oil-resistant and of such hardness and of non-deformable rigidity as to cause the length of engaged tubing under pressure of said coupling means to become relatively deformed as may be necessary to fit snugly in surface-to-surface relation with said friction holding means, whereby said friction holding means, whereby said friction holding means serves as a permanent seal against said deformed tubing around the punctured hole in the tubing, and frictionally holds the tubing against displacement in response to environmental vibration forces.

2. A line tap valve, as in claim 1, in which
    said frictional material consists of a rigid thin layer of a material consisting of a hardened mixture of asbestos and a neoprene based binder.

3. A line tap valve, as in claim 2, in which
    said coupling means include threaded screw means fitted to pull the two blocks to direct surface-to-surface engagement and to provide the pressure needed to distort and deform the length of engaged tubing to assure the proper surface-to-surface sealing, and the frictional holding against casual unwanted displacement.

4. A line tap valve for use with any selected one of a consecutive series of pipelines of gradually increased outer diameter size, such valve comprising
    an upper metal block having an axial bore and an undersurface shaped in part concavely downward with a fluted concavity of arcuate cross-section symmetrically transverse to said bore and with the lower end of said bore terminating at said fluted concavity surface contour;
    a lower metal block for mating with said upper metal block and having a concave top surface to mate with said fluted concavity of said upper block to define a region for receiving and holding a section of pipeline;
    an adapter for seating in said concave top surface of said lower block and having and providing a concave seat of appropriate curvature to support a selected pipeline section;
    means for holding said adapter in proper position in said in said lower block;
    and friction and sealing means comprising an arcuate layer disposed in and on the surface of the fluted concavity, said layer having a uniform thickness and characterized by a hardness combined with the strength of the backing surface of said concavity to be sufficient to cause deformation of said pipeline section to contour surface engagement between said friction means and said pipeline section when said two metal blocks are pressed to predetermined closeness;
    and means for pressing said two metal blocks to such predetermined closeness.

5. A line tap valve for use with any selected one of a consecutive series of pipelines of gradual stepwise increased diameters, such valve comprising
    a base block having a transverse groove of arcuate cross-section to receive a section of pipeline of outside diameter of maximum diameter within the series of dimensions to be accommodated;
    a top block having a transverse groove to match axially with the transverse groove of said base to define a transverse bore for accommodating a section of pipeline;
    means for coupling the two blocks and effective to establish gradually varying degrees of pressure on an included section of pipeline;
    needle means having an axis and disposed in the top block transverse to said bore and manually axially movable to puncture such a section of pipeline in position in said bore;

a layer of gasket material having an arcuate cross-section lining the transverse groove of the top block and having an opening co-axial with said needle means to permit free axial movement of said needle, said layer of gasket material being characterized by hardness and resistance to flow under pressure, and serving to deform a section of pipeline within said bore to conform and sealingly seat against the surface of said gasket material, when said two blocks are tightened to a predetermined degree.

6. A line tap valve, as in claim 5, in which said coupling means act to press said two blocks directly against said pipeline.

7. A line tap valve, as in claim 5, including an adapter of arcuate shape having an external curvature to seat conformably in the groove of the base block, and having an inner curvature to accept a section of pipeline of smaller diameter than the diameter corresponding to the curvature of the groove of said base block, whereby a section of pipeline of such smaller diameter may be compactly seated between said adapter and said layer of gasket material.

8. A line tap valve, as in claim 7, in which the tightening of the two blocks to predetermined position compresses the included tubing to slightly oval configuration with the two side walls moved outwardly to full surface engagement with the sealing gasket.

References Cited
UNITED STATES PATENTS

| | | | |
|---|---|---|---|
| 2,459,720 | 1/1949 | Poltorak | 277—227 |
| 3,115,889 | 12/1963 | Franck et al. | 137—318 |
| 3,198,206 | 8/1965 | O'Brien | 137—318 X |
| 3,252,475 | 5/1966 | Jones | 137—318 |

WILLIAM F. O'DEA, *Primary Examiner.*

D. R. MATTHEWS, *Assistant Examiner.*

UNITED STATES PATENT OFFICE
CERTIFICATE OF CORRECTION

Patent No. 3,336,937

August 22, 1967

Henry Ehrens et al.

It is hereby certified that error appears in the above numbered patent requiring correction and that the said Letters Patent should read as corrected below.

In the heading to the printed specification, line 4, for "assignors to Seal Unit Parts Co., Inc.," read -- assignors to Sealed Unit Parts Co., Inc., --; column 10, lines 8 and 9, strike out "whereby said friction holding means,"; line 45, strike out "in said".

Signed and sealed this 30th day of July 1968.

(SEAL)
Attest:

Edward M. Fletcher, Jr.
Attesting Officer

EDWARD J. BRENNER
Commissioner of Patents